(No Model.)
I. W. CONSELYEA.
PROPELLING MECHANISM FOR BICYCLES.
No. 588,955. Patented Aug. 31, 1897.
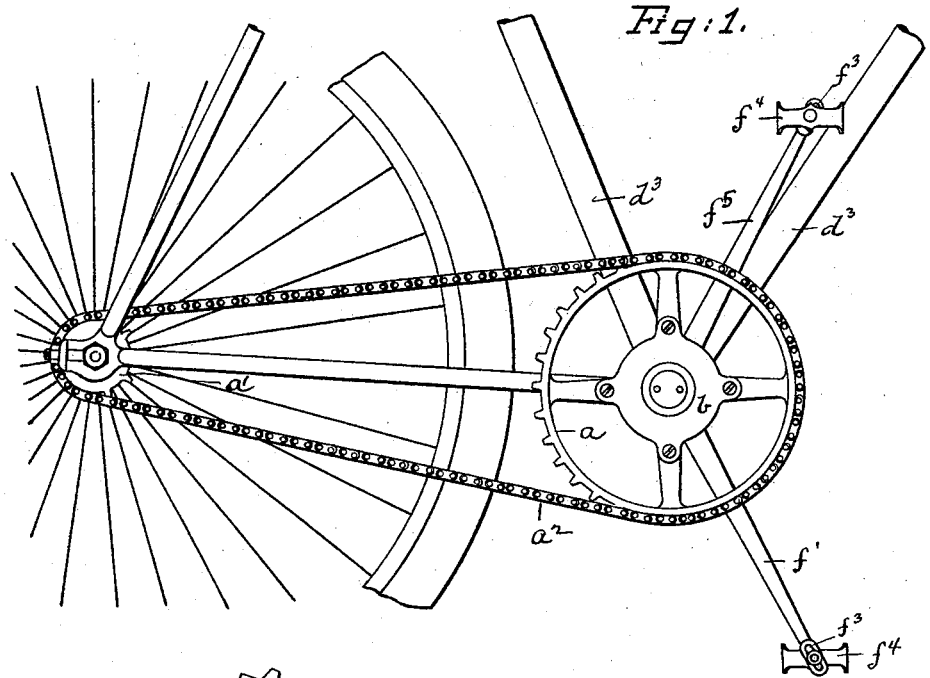
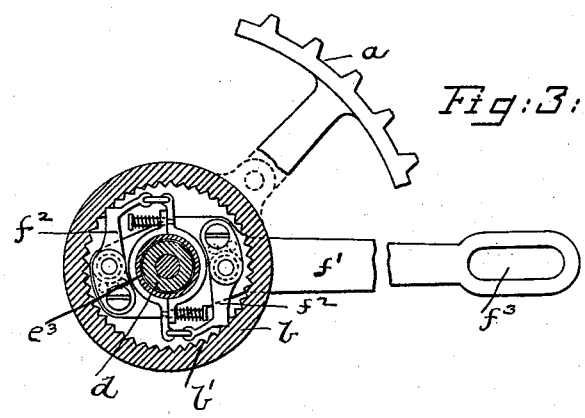
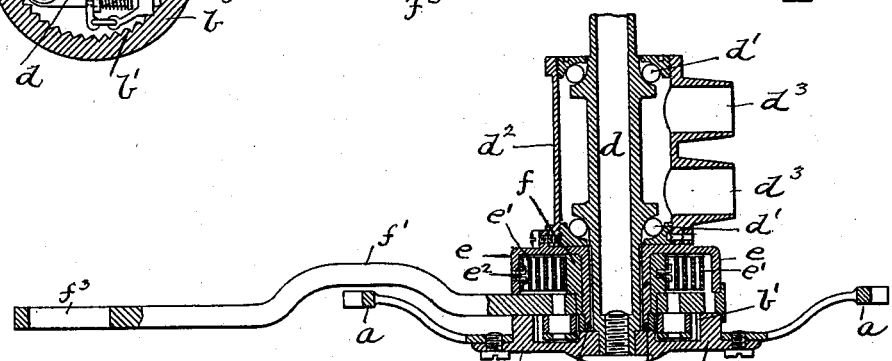
WITNESSES:
M. C. Evrding
Judson F. Vogdes
INVENTOR:
Ira W. Conselyea
by Henry E. Evrding,
his Attorney.
THE NORRIS PETERS CO., PHOTO-LITHO., WASHINGTON, D. C.

UNITED STATES PATENT OFFICE.

IRA W. CONSELYEA, OF NEWARK, NEW JERSEY.

PROPELLING MECHANISM FOR BICYCLES.

SPECIFICATION forming part of Letters Patent No. 588,955, dated August 31, 1897.

Application filed January 16, 1897. Serial No. 619,406. (No model.)

*To all whom it may concern:*

Be it known that I, IRA W. CONSELYEA, a citizen of the United States, residing at Newark, in the county of Essex and State of New Jersey, have invented certain new and useful Improvements in Propelling Mechanism for Bicycles and Similar Vehicles, of which the following is a specification.

My invention has relation to a propelling mechanism for bicycles, velocipedes, and similar vehicles, and in such connection it relates particularly to the construction and arrangement of such mechanism.

The principal objects of my invention are, first, to provide a propelling mechanism of simple construction by means of which the bicycle may be propelled with greater speed and with less exertion; second, to provide in a bicycle or similar vehicle a propelling mechanism consisting of a sprocket and chain, a ratchet-disk secured to or formed integral with the sprocket, a shaft secured to the disk and revolving in a fixed sleeve or crank-hanger supported by the bicycle-frame, a treadle-lever pivoted to said crank-hanger, a spiral or helical spring coiled around said hanger, one end of said spring being secured to the hanger and the other to the treadle-lever, and a pawl mechanism carried by the treadle-lever and adapted to operate the ratcheted disk in one direction, and, third, to provide, in connection with the treadle-lever, the spring, and the shaft, a spring-case inclosing the spring and traversed by said shaft.

My invention, stated in general terms, consists of a propelling mechanism for bicycles and similar vehicles constructed and arranged in substantially the manner hereinafter described and claimed.

The nature and scope of my invention will be more fully understood from the following description, taken in connection with the accompanying drawings, forming part hereof, and in which—

Figure 1 is a side elevational view of a portion of a bicycle and showing my improved propelling mechanism secured thereto in operative position. Fig. 2 is an enlarged horizontal sectional view of the propelling mechanism; and Fig. 3 is a vertical section, enlarged, of said propelling mechanism.

Referring to the drawings, $a$ represents the driving-sprocket, $a'$ the driven sprocket, and $a^2$ the chain, of a bicycle or similar vehicle. To the driving-sprocket $a$ is secured in any suitable manner a disk or ring $b$, the interior of which is toothed or ratcheted, as at $b'$. The disk $b$ is secured to one end of a shaft $d$, preferably hollow, which rotates on ball-bearings $d'$ within the crank-hanger $d^2$, which is supported by the frame $d^3$ of the vehicle. To the hanger $d^2$ is firmly secured a case or cap $e$, within which is coiled a spring $e'$, one end of the spring being secured to the case or cap $e$, as at $e^2$. The cap $e$ is traversed by the shaft $d$, which it surrounds. On that portion $e^3$ of the cap surrounding the shaft rotates a sleeve $f$, which is integral with or secured to a treadle-lever $f'$, and to this sleeve $f$ the other end of spring $e'$ is secured. The treadle-lever $f'$ is provided with the spring-controlled pawls $f^2$, adapted when the treadle-lever $f'$ is moved against the tension of spring $e'$ in one direction—*i.e.*, depressed—to engage the teeth $b'$ of disk $b$, and to thereby rotate said disk, the sprocket $a$, and shaft $d$. When, however, the treadle-lever is moved in an opposite direction—*i.e.*, elevated by the spring $e'$—the pawls $f^2$ slip away from the disk $b$. The free ends of the treadle $f'$ are slotted, as at $f^3$, and in this slot are adjustably secured the pedals $f^4$ of the ordinary construction.

It is to be understood that on the end of shaft $d$, opposite to that to which the disk $b$ and sprocket $a$ are secured, a second disk (not shown) is also secured, and this second disk is operated by a second treadle-lever $f^5$ and pawls, (not shown,) and the spring-case $e$, spring $e'$, and connections between the same and treadle-lever $f'$ are duplicated.

In operation, when a treadle-lever $f'$ or $f^5$ is depressed its pawl mechanism will drive a ratcheted disk, which in turn will operate the sprocket $a$ either directly or through the shaft $d$. The spring $e'$ is tightly coiled within the case $e$ by this movement of the lever and serves, when pressure downward on the lever is removed, to elevate the lever to substantially upright position. The pawls $f^2$ being released from the disk on this upward movement to the lever, the disk is free to rotate in the direction it is propelled by the treadle-lever.

Having thus described the nature and objects of my invention, what I claim as new, and desire to secure by Letters Patent, is—

1. In a propelling mechanism for vehicles the combination with a driving-sprocket, of a ratcheted disk secured thereto, a shaft secured to the disk, a crank-hanger within which said shaft rotates and supported by the frame of the vehicle, a treadle-lever pivoted on the crank-hanger, a spring coiled around said hanger, one end of said spring being secured to the hanger and the other to the treadle-lever, and a pawl mechanism carried by said treadle-lever and adapted to operate said disk in one direction, substantially as described.

2. The combination of a driving-sprocket, a ratcheted disk secured thereto, a shaft carried by said disk, a crank-hanger supported by the frame of a bicycle, within which the shaft is adapted to rotate, a case or cap secured to said hanger, a sleeve oscillating within said cap, a treadle-lever carried by said sleeve, a coiled spring, one end of which is secured to said cap and the other to said sleeve, and a pawl mechanism carried by said treadle-lever and adapted to operate the ratcheted disk in one direction, substantially as described.

IRA W. CONSELYEA.

Witnesses:
E. W. BOND,
W. B. ADAMS.